United States Patent
Lee

(10) Patent No.: US 12,083,406 B2
(45) Date of Patent: Sep. 10, 2024

(54) BICYCLE SIMULATOR

(71) Applicant: REAL DESIGN TECH CO., LTD., Gyeonggi-do (KR)

(72) Inventor: Joong Sik Lee, Gyeonggi-do (KR)

(73) Assignee: REAL DESIGN TECH CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/256,838

(22) PCT Filed: Dec. 9, 2021

(86) PCT No.: PCT/KR2021/018660
§ 371 (c)(1),
(2) Date: Jun. 9, 2023

(87) PCT Pub. No.: WO2022/124824
PCT Pub. Date: Jun. 16, 2022

(65) Prior Publication Data
US 2024/0024755 A1    Jan. 25, 2024

(30) Foreign Application Priority Data

Dec. 11, 2020  (KR) .......................... 10-2020-0173779
Feb. 1, 2021   (KR) .......................... 10-2021-0013929

(51) Int. Cl.
*A63B 69/16*   (2006.01)
*A63B 71/06*   (2006.01)
*G06F 3/01*    (2006.01)

(52) U.S. Cl.
CPC .......... *A63B 71/0622* (2013.01); *A63B 69/16* (2013.01); *G06F 3/013* (2013.01); *A63B 2071/0644* (2013.01); *A63B 2220/803* (2013.01)

(58) Field of Classification Search
CPC ....................................................... G06F 3/013
See application file for complete search history.

(56) References Cited

U.S. PATENT DOCUMENTS

| 2007/0229397 A1* | 10/2007 | Sefton ................ A63B 71/0622 348/E13.059 |
| 2011/0287901 A1* | 11/2011 | Wan ................... A63B 22/0023 482/57 |

(Continued)

FOREIGN PATENT DOCUMENTS

| JP | 2002253847 A | 9/2002 |
| JP | 2011107482 A | 6/2011 |

(Continued)

OTHER PUBLICATIONS

International Search Report of PCT/KR2021/01866 mailed Mar. 14, 2022 (2 pages).

(Continued)

*Primary Examiner* — Ryan A Lubit
(74) *Attorney, Agent, or Firm* — Guntin & Gust, PLC; Miyoung Shin

(57) ABSTRACT

A bicycle simulator includes: a base portion; a frame support portion connected to the base portion to be movable in a direction and configured to support a frame of a bicycle docked, the frame connecting a front wheel with a rear wheel of the bicycle; a first sensor portion configured to obtain sight information of a rider riding on the bicycle; a processor configured to generate a virtual image that is changed according to the sight information of the rider obtained by the first sensor portion; and a display displaying the virtual image.

11 Claims, 19 Drawing Sheets

(56) References Cited

U.S. PATENT DOCUMENTS

| | | | | |
|---|---|---|---|---|
| 2012/0331058 | A1* | 12/2012 | Huston | H04W 4/20 |
| | | | | 709/204 |
| 2018/0280762 | A1* | 10/2018 | Tsukahara | G06F 3/0482 |
| 2018/0318647 | A1* | 11/2018 | Foley | A63F 13/798 |
| 2019/0221191 | A1* | 7/2019 | Chhipa | G09G 3/002 |
| 2020/0150756 | A1* | 5/2020 | Malafeew | A63B 69/16 |
| 2021/0046391 | A1* | 2/2021 | Board | A63G 31/16 |
| 2021/0132689 | A1* | 5/2021 | Yudanov | G06F 3/0488 |
| 2021/0197015 | A1* | 7/2021 | Anderson | A63B 21/015 |

FOREIGN PATENT DOCUMENTS

| | | | |
|---|---|---|---|
| KR | 101763404 | B1 | 7/2017 |
| KR | 102039402 | B1 | 11/2019 |
| KR | 1020190141571 | | 12/2019 |

OTHER PUBLICATIONS

International Written Opinion of PCT/KR2021/01866 mailed Mar. 14, 2022 (5 pages).

\* cited by examiner

MOVE TO LEFT SIDE

MOVE TO RIGHT SIDE

BICYCLE SIMULATOR

TECHNICAL FIELD

The disclosure relates to a bicycle simulator for virtual driving, and more particularly, to a bicycle simulator by which various riding paths may be virtually experienced in an indoor space, and riders located in different spaces may virtually have a bicycle riding experience in the same cyber space.

BACKGROUND ART

Generally, a bicycle exercise machine called a bicycle trainer or a bicycle roller is one of the most widely used indoor fitness machines along with a running machine. The bicycle exercise machine may facilitate the enhancement of muscular strength of the lower body in a way in which a rider riding on a bicycle mounted on a rotation roller or a dock rotates a wheel, by using a pedal, the wheel receiving rotational resistance (a magnetic force, etc.). According to a previous bicycle exercise machine, a rider alone pedals the bicycle in a closed indoor space and may not share the bicycle riding experience with another rider.

With the recent development of techniques, an augmented reality service may be provided to a user by providing visual information with respect to a virtual object through a display. Accordingly, a user in a closed indoor space may have the same experience as riding together with another rider in an outdoor riding environment. Here, the user's sight may be used for interaction between a virtual object on a display or a real object in a real space and the user.

DISCLOSURE

Technical Problem

The purpose of the disclosure is to provide a bicycle simulator configured to allow, in an indoor space, the same riding experience as in an outdoor riding environment by changing a virtual image realized on a display, as sight information of a user riding on a bicycle supported by a bicycle dock is changed.

Also, another purpose of the disclosure is to provide a bicycle simulator configured to effectively provide information needed by a user, by displaying a focused virtual image determined according to user input information and user sight information.

Also, another purpose of the disclosure is to provide a bicycle simulator configured to effectively provide auditory information determined according to user input information and user sight information.

Also, another purpose of the disclosure is to provide a bicycle simulator configured to allow, in an indoor space, the same riding experience as in an outdoor riding environment by changing a virtual image realized on a display, according to a riding state of a bicycle supported by a bicycle dock.

Technical Solution

A bicycle simulator according to an embodiment of the disclosure includes: a base portion; a frame support portion connected to the base portion to be movable in a direction and configured to support a frame of a bicycle docked, the frame connecting a front wheel with a rear wheel of the bicycle; a first sensor portion configured to obtain sight information of a rider riding on the bicycle; a processor configured to generate a virtual image that is changed according to the sight information of the rider obtained by the first sensor portion; and a display displaying the virtual image.

The sight information sensed by the first sensor portion may include a change of a sight direction of the rider.

The processor may further be configured to move a frame of the virtual image according to the change of the sight direction of the rider.

The processor may further be configured to arrange a focused virtual image on a virtual image area generated as the frame of the virtual image is moved.

The bicycle simulator may further include an input portion configured to input personal information of the rider and a memory storing one or more focused virtual images. The processor may further be configured to select a focused virtual image from among the one or more focused virtual images according to the personal information of the rider and arrange the selected focused virtual image on the virtual image area.

The virtual image may include one or more of a bicycle avatar, a riding road, and an ambient object.

The focused virtual image may include one or more of an advertisement image, identification information of another rider, a speed of a bicycle of a competitive rider, a distance, and a collision risk alert.

The bicycle simulator may further include: a slide guide fixed to the base portion and extending in a direction; a slide portion fixed to an end of the frame support portion and connected to the slide guide to be movable in the direction on the slide guide; and a second sensor portion configured to sense a movement direction and a movement distance of the slide portion configured to move on the slide guide.

The processor may further be configured to move the frame of the virtual image according to a change of the movement direction and the movement distance of the slide portion obtained by the second sensor portion.

The processor may further be configured to arrange a focused virtual image on a virtual image area generated as a frame of the virtual image is moved.

The sight information sensed by the first sensor portion may include a change of a focus position of both eyes of the rider.

The processor may further be configured to reduce or expand a frame of the virtual image according to the change of the focus position of both eyes of the rider.

The processor may further be configured to, when the focus position of both eyes of the rider decreases, arrange the focused virtual image on the reduced frame of the virtual image.

The bicycle simulator may further include an input portion configured to input personal information of the rider and a memory storing one or more focused virtual images. The processor may further be configured to select a focused virtual image from among the one or more focused virtual images according to the personal information of the rider and arrange the selected focused virtual image on the reduced frame of the virtual image.

The virtual image may include one or more of a bicycle avatar, a riding road, and an ambient object.

The focused virtual image may include one or more of an advertisement image, identification information of another rider, a speed of a bicycle of a competitive rider, a distance, and a collision risk alert.

The bicycle simulator may further include: a front wheel roller configured to support the front wheel of the bicycle and rotate together with rotation of the front wheel; a rear wheel roller configured to support the rear wheel of the bicycle and rotate together with rotation of the rear wheel; and a third sensor portion configured to sense a rotational speed or a rotational distance of one or more of the front wheel roller and the rear wheel roller.

The processor may further be configured to reduce or expand a frame of the virtual image according to a change of the rotational speed of one or more of the front wheel roller and the rear wheel roller.

The processor may further be configured to, when the rotational speed of the one or more of the front wheel roller and the rear wheel roller is increased, arrange the focused virtual image on the reduced frame of the virtual image.

The processor may further be configured to generate auditory information that is changed according to the sight information of the rider obtained by the first sensor portion, and the bicycle simulator may further include an auditory output portion configured to output the auditory information.

The processor may further be configured to reduce or expand a frame of the virtual image according to a change of a focus position of both eyes of the rider, and the processor may further be configured to generate the auditory information that is changed as the frame of the virtual image is reduced.

The processor may further be configured to reduce or expand a frame of the virtual image according to a change of a focus position of both eyes of the rider, and the processor may further be configured to generate the auditory information that is changed as the frame of the virtual image is expanded.

The first sensor portion may be arranged above the display.

The display may include a wearable augmented reality device to be worn by the rider, and the first sensor portion may be arranged in the augmented reality device.

Advantageous Effects

According to the disclosure, a virtual image realized on a display may be changed as sight information of a user riding on a bicycle supported by a bicycle dock is changed, and thus, the same riding experience may be provided in an indoor space as in an outdoor riding environment, so that a rider may enjoy a relatively more realistic riding experience in the indoor space.

Also, by displaying a focused virtual image determined according to user input information and user sight information, information needed by a user may be effectively provided.

Also, auditory information determined according to the user input information and the user sight information may be effectively provided.

Also, the virtual image realized on the display may be changed according to a riding state of the bicycle supported by the bicycle dock, and thus, the same riding experience may be provided in the indoor space as in the outdoor riding environment, so that the rider may enjoy a relatively more realistic riding experience in the indoor space.

MODE FOR INVENTION

Figure 1A:
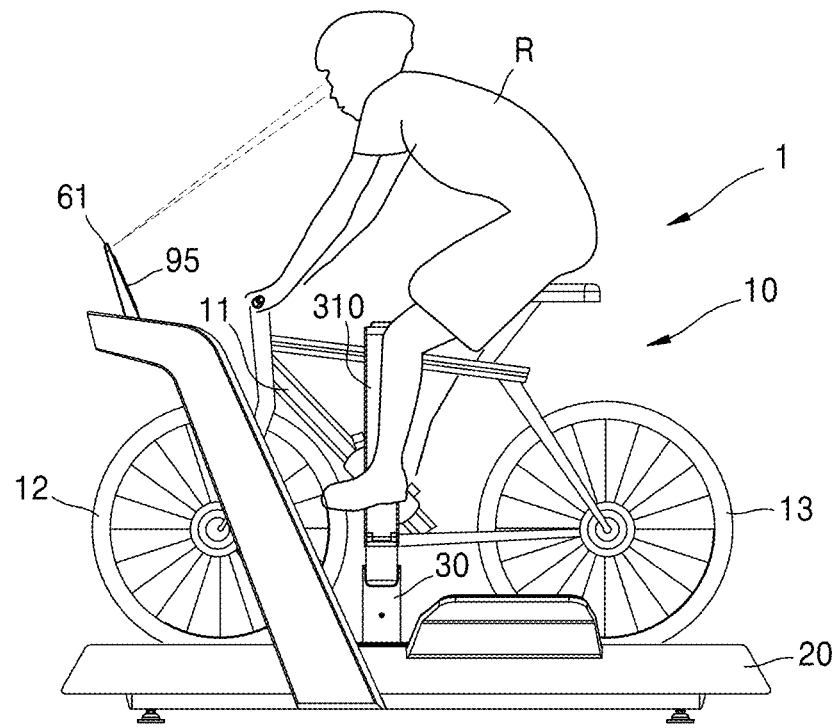
FIG. 1A is a side view of a bicycle simulator according to an embodiment of the disclosure.

Hereinafter, embodiments will be described in detail by referring to the accompanying drawings. In descriptions with reference to the drawings, the same reference numerals are given to elements that are the same or substantially the same and descriptions will not be repeated.

The embodiments may be variously modified, and thus, particular embodiments will be illustrated in the drawings and described in detail in the detailed description. The effects and the characteristics of the embodiments, and methods of realizing the same will become apparent by referring to the drawings and the aspects described in detail below. However, the embodiments are not limited to the embodiments disclosed below and may be realized in various forms.

In the embodiments hereinafter, the terms "first," "second," etc. are not used as restrictive meanings but are used to distinguish one component from another.

In the embodiments hereinafter, the singular expressions "a," "an," and "the" are intended to include the plural forms as well, unless the context clearly indicates otherwise.

In the embodiments hereinafter, the terms "above (upper)," "below (lower)," "right and left (side or lateral)," "front (forward, in front of)," "rear (back, behind)," etc., which indicate directions, are not defined as a restrictive sense of the claims, but are defined based on the drawings and relative positions between components, for convenience of explanation. Thus, each direction described hereinafter should be understood based thereon except for a case particularly otherwise defined.

It will be further understood that the terms "comprises" and/or "comprising" used herein specify the presence of stated features or components, but do not preclude the presence or addition of one or more other features or components.

Sizes of elements in the drawings may be exaggerated for convenience of explanation. For example, sizes and thicknesses of the elements in the drawings are randomly indicated for convenience of explanation, and thus, the embodiments are not necessarily limited to the illustrations of the drawings.

The embodiments described in this specification may have exclusively hardware aspects, partially hardware and partially software aspects, or exclusively software aspects. In this specification, the term "unit," "module," "device," "system," or the like refers to a computer-related entity including a hardware entity, a combination of a hardware entity and a software entity, or a software entity. For example, in this specification, the unit, module, device, system, or the like may be a process being executed, a processor, an object, an executable file, a thread of execution, a program, and/or a computer, but is not limited thereto. For example, both of an application executed in a computer and the computer may correspond to the unit, module, device, system, or the like in this specification.

Figure 1B:
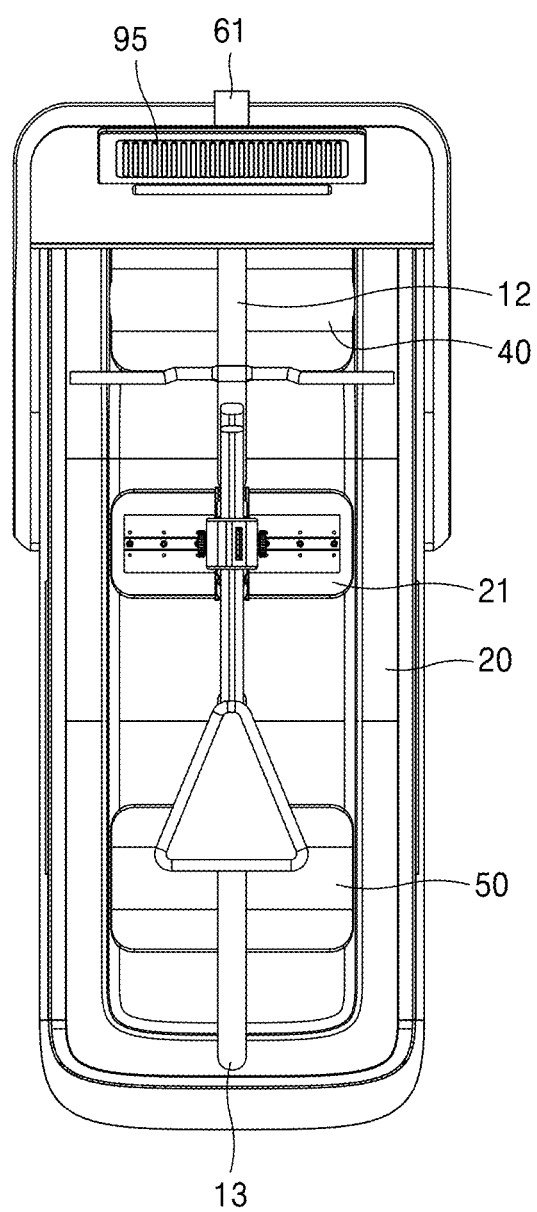
FIG. 1B is a plan view of a bicycle simulator according to an embodiment of the disclosure.
Figure 2A:
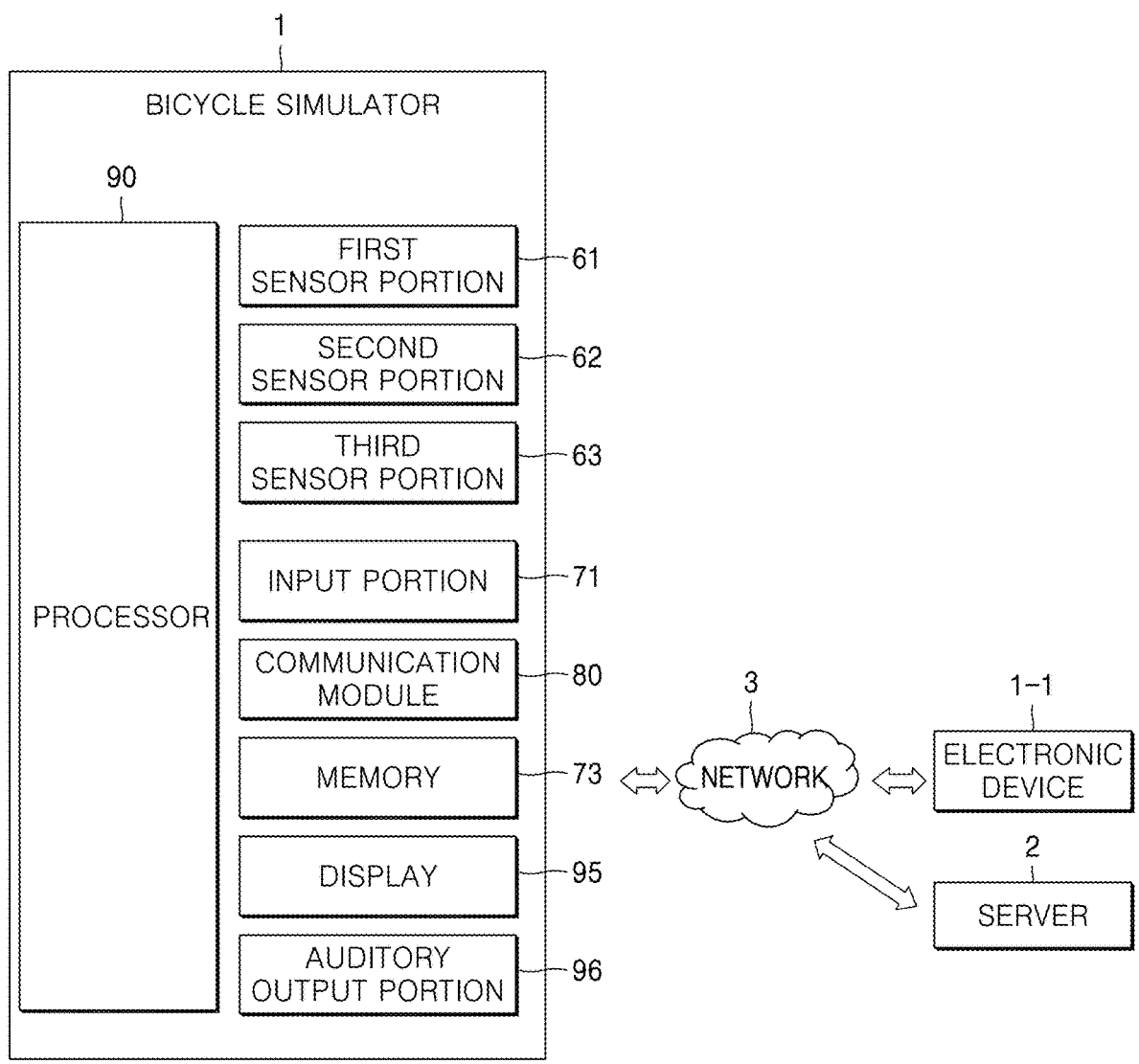
FIG. 2A is a block diagram of a bicycle simulator according to an embodiment of the disclosure.
Figure 2B:
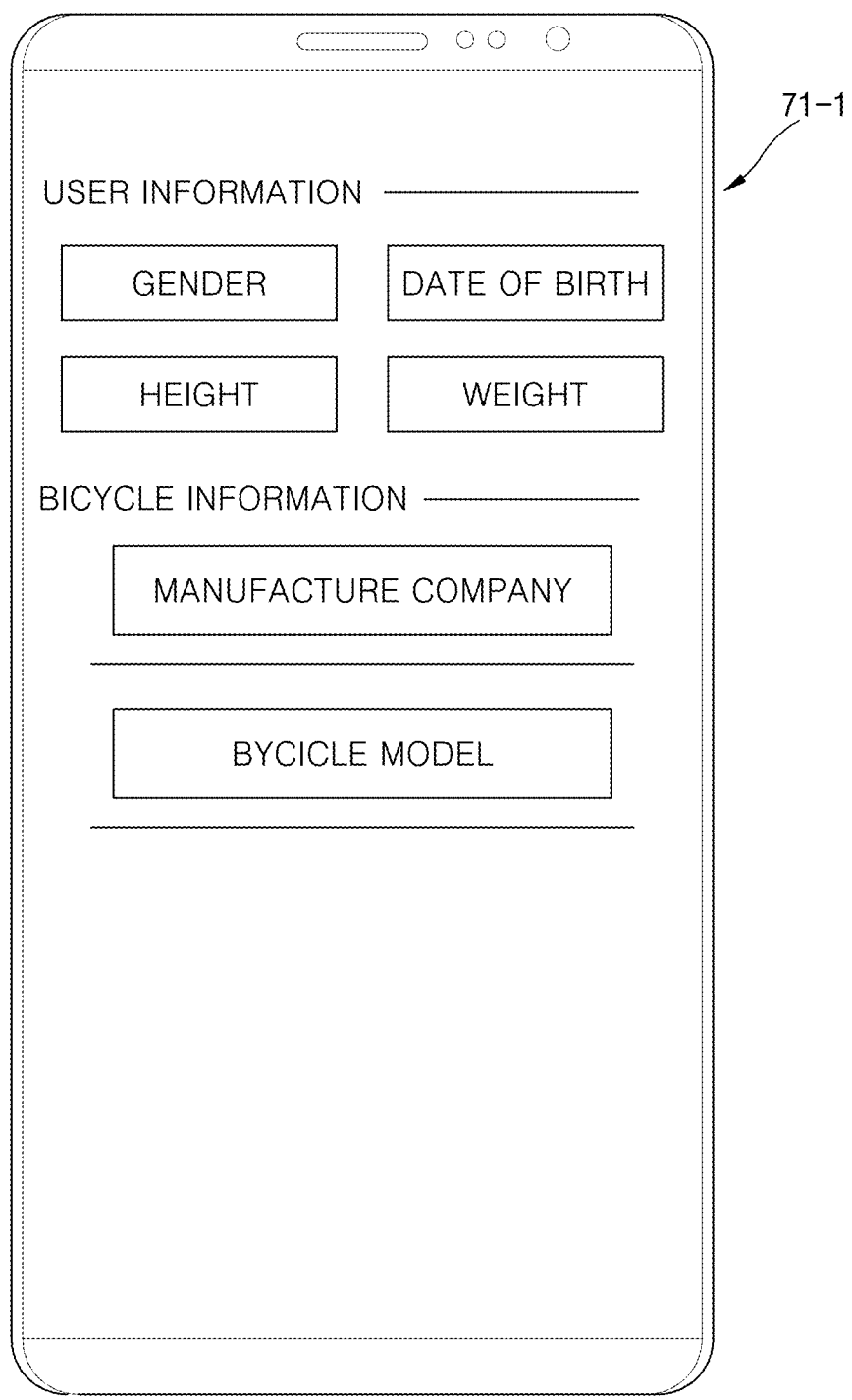
FIG. 2B is a schematic diagram of an input portion according to an embodiment of the disclosure.

FIG. 1 is a side view of a bicycle simulator according to an embodiment of the disclosure. FIG. 1B is a plan view of the bicycle simulator according to an embodiment of the disclosure. FIG. 2A is a block diagram of the bicycle simulator according to an embodiment of the disclosure. FIG. 2B is a schematic diagram of an input portion according to an embodiment of the disclosure. FIG. 3B is a schematic diagram of an augmented reality device to which a first sensor portion is coupled, according to an embodiment of the disclosure.

A bicycle simulator 1 according to an embodiment of the disclosure may allow a rider R riding on a bicycle 10 supported by the bicycle simulator 1 to virtually experience the same state as an actual riding environment so as to enjoy a realistic riding experience regardless of an outdoor riding environment.

The bicycle 10 described above may be specially manufactured only for the bicycle simulator 1 according to an embodiment of the disclosure. However, the bicycle 10 may also include all bicycles 10 currently sold by various manufacturing companies. The bicycle 10 may include a bicycle frame 11 forming a body of the bicycle 10, a front wheel 12 and a rear wheel 13 that are rotatably mounted on the bicycle frame 11, and a driving system (a crank, a chain, an accelerator, etc.) converting the pedaling of the rider R to a rotational force of the rear wheel 13.

In order to realize the function or operation as described above, the bicycle simulator 1 according to an embodiment of the disclosure may include a base portion 20, a frame support portion 30, a front wheel roller 40, a rear wheel roller 50, a first sensor portion 61, a second sensor portion 62, a third sensor portion 63, an input portion 71, a memory 73, a communication module 80, a processor 90, a display 95, and an auditory output portion 96.

Hereinafter, each of the components is to be described in detail.

Referring to FIGS. 1A to 3, the base portion 20 according to an embodiment of the disclosure may be a support member fixed on the ground and capable of supporting the bicycle 10. For example, the base portion 20 may be provided as a quadrangular frame on which the front wheel roller 40 and the rear wheel roller 50 to be described below may be mounted. However, the disclosure is not limited thereto, and the base portion 20 may be provided as an arbitrary support member on which the front wheel roller 40 and the rear wheel roller 50 may be mounted. Also, a support frame 21 to which the frame support portion 30 may be connected may be arranged across both side portions of the base portion 20 according to an example.

The frame support portion 30 may be a support member detachably coupled to the bicycle frame 11 and stably fixing a position of the bicycle 10. For example, the frame support portion 30 may be realized as a support member having a straight road shape extending in a direction.

A clamp device 310 may be arranged at an end of the frame support portion 30, and a side portion of the bicycle frame 11, for example, at least one of a top tube and a down tube, may be detachably coupled to the clamp device 310. Here, the clamp device 310 may be provided to be detachable so that a side portion of the bicycle frame 11 may be detachably coupled to the clamp device 310. However, the disclosure is not limited thereto, and other types of locking devices which may support a side portion of the bicycle frame 11 may be realized. Another end of the frame support portion 30 may be arranged to be movable in a direction with respect to the support frame 21 provided on the base portion 20.

The front wheel roller 40 may be a cylindrical-shaped component supporting the front wheel 12 of the bicycle 10 docked on the bicycle simulator 1 and rotating together with the rotation of the front wheel 12, and both ends of the front wheel roller 40 may be rotatably connected to the base portion 20 so as to be freely rotated in a front direction or a rear direction with respect to the docked bicycle 10.

The rear wheel roller 50 may be a cylindrical-shaped component supporting the rear wheel 13 of the bicycle 10 docked on the bicycle simulator 1 and rotating together with the rotation of the rear wheel 12, and both ends of the rear wheel roller 50 may be rotatably connected to the base portion 20 so as to be freely rotated in a front direction or a rear direction with respect to the docked bicycle 10.

The first to third sensor portions 61 to 63 may be sensing devices configured to obtain sight information of the rider R riding on the bicycle 10 docked on the bicycle simulator 1 or sense a riding state of the bicycle 10 docked on the bicycle simulator 1. For example, the first sensor portion 61 may obtain the sight information of the rider R riding on the bicycle 10 docked on the bicycle simulator 1, the second sensor portion 62 may sense a riding direction of the bicycle 10, and the third sensor portion 63 may sense a riding speed and a riding distance of the bicycle 10. Aspects related to the operation of sensing of the sight information or the rider R and the riding state of the bicycle 10 by using the first to third sensor portions 61 to 63 are to be described in more detail with reference to FIGS. 4 to 12.

The input portion 71 may receive a command of the rider R to control the bicycle simulator 1 or physical information of the rider R, for example, information about a gender, an age, a height, a race, a hair color, a weight, etc. Also, the input portion 71 according to an embodiment may receive a model of the bicycle 10 docked on the bicycle simulator 1. Also, the bicycle simulator 1 according to an embodiment may obtain the physical information of the rider R without an input using the input portion 71, by arranging a weight measuring portion (not shown) below the frame support portion 30.

According to an embodiment, the input portion 71 may include an input of manipulating a button, a keypad, a mouse, a track ball, a jog switch, a knop, etc. integrally formed in the bicycle simulator 1, an input of touching a touch pad or a touch screen, a voice input, a motion input, a biometric input (for example, iris recognition, fingerprint recognition, etc.), etc. Also, the input portion 71 according to an embodiment may be realized as a cellular phone 71-1 of a user as illustrated in FIG. 2B. The cellular phone 71-1 of the user may transmit information input from the user to the processor 90 by being connected to the communication module 80.

The memory 73 may store various pieces of data used by at least one component (e.g., the processor 90 or the sensor module 60) of the bicycle simulator 1, for example, software and input data or output data with respect to a command related to the software. The memory 73 may include a volatile memory or a nonvolatile memory.

The communication module 80 may support establishment of a wired or wireless communication channel between the bicycle simulator 1 and an external electronic device (e.g., a different bicycle simulator 1-1 or a server 2) and execution of communication through the established communication channel. The communication module 80 may include one or more communication processors operated independently from the processor 90 (e.g., an application processor) and supporting wired communication or wireless communication. According to an embodiment, the communication module 80 may include a wireless communication module (e.g., a cellular communication module, a short-range wireless communication module, or a global navigation satellite system (GNSS) communication module) or a wired communication module (e.g., a local area network (LAN) communication module or a power line communication module) and may use a corresponding communication module from among the communication modules to communicate with an external electronic device through a network 3 (e.g., a near-field communication network such as Bluetooth, WiFi direct, or infrared data association (IrDA) or a remote communication network such as a cellular network, the Internet, or a computer network (e.g., a local area network (LAN) or a wide area network (WAN)). Various communication modules 80 described above may be realized as a single chip, or each may be realized as a separate chip.

The processor 90 may, for example, drive software to control, for example, at least one other component (e.g., a hardware or software component) connected to the processor 90 and perform various data processing and calculation operations. The processor 90 may load a command or data received from other components (e.g., the first to third sensor portions 61 to 63 or the communication module 80) in the memory 73, for example, a volatile memory and process the command or the data, and then, may store resultant data in the memory 73, for example, a nonvolatile memory.

Figure 3:
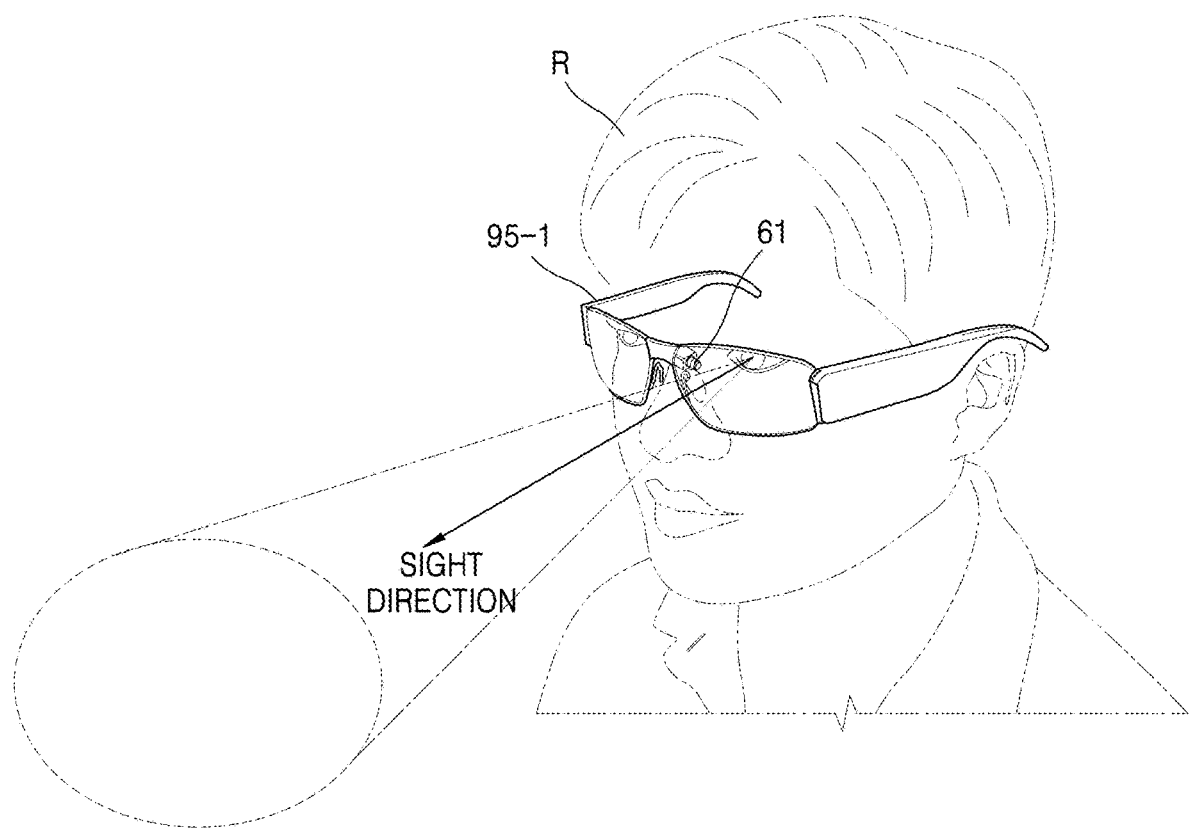
FIG. 3 is a schematic diagram of an augmented reality device to which a first sensor portion is coupled, according to an embodiment of the disclosure.

The display 95 may be a component visually transmitting, to the rider R, an advertisement image, a riding environment with respect to a bicycle competition course or the like, an operating system program, etc. For example, the display 95 may be realized as a display arranged in front of the rider R, as illustrated in FIG. 1A, or as a wearable augmented reality device 95-1 worn by the rider R, as illustrated in FIG. 3. For example, various virtual images, such as another rider R, an obstacle, etc., in addition to a bicycle riding path may be displayed on the display 95 or 95-1. For example, when the display 95 is arranged in front of the rider R as illustrated in FIG. 1A, the first sensor portion 61 may be arranged above the display 95. As another example, when the display 95 is realized as the wearable augmented reality device 95-1 as illustrated in FIG. 3, the first sensor portion 61 may be arranged at a side portion of the augmented reality device. However, the disclosure is not limited thereto, and the first sensor portion 61 may be arranged at an arbitrary position to obtain the sight information of the rider R.

The auditory output portion 96 may be a component auditorily transmitting, to the rider R, a riding environment with respect to a course of a bicycle competition, or the like, an operating system program, etc. For example, the auditory output portion 96 may include an arbitrary audio device, etc. capable of transmitting auditory information to the rider R. For example, the auditory output portion 96 may auditorily output various types of information, such as a cheer or an alert for the rider R, etc., in addition to the bicycle riding environment.

Figure 4:
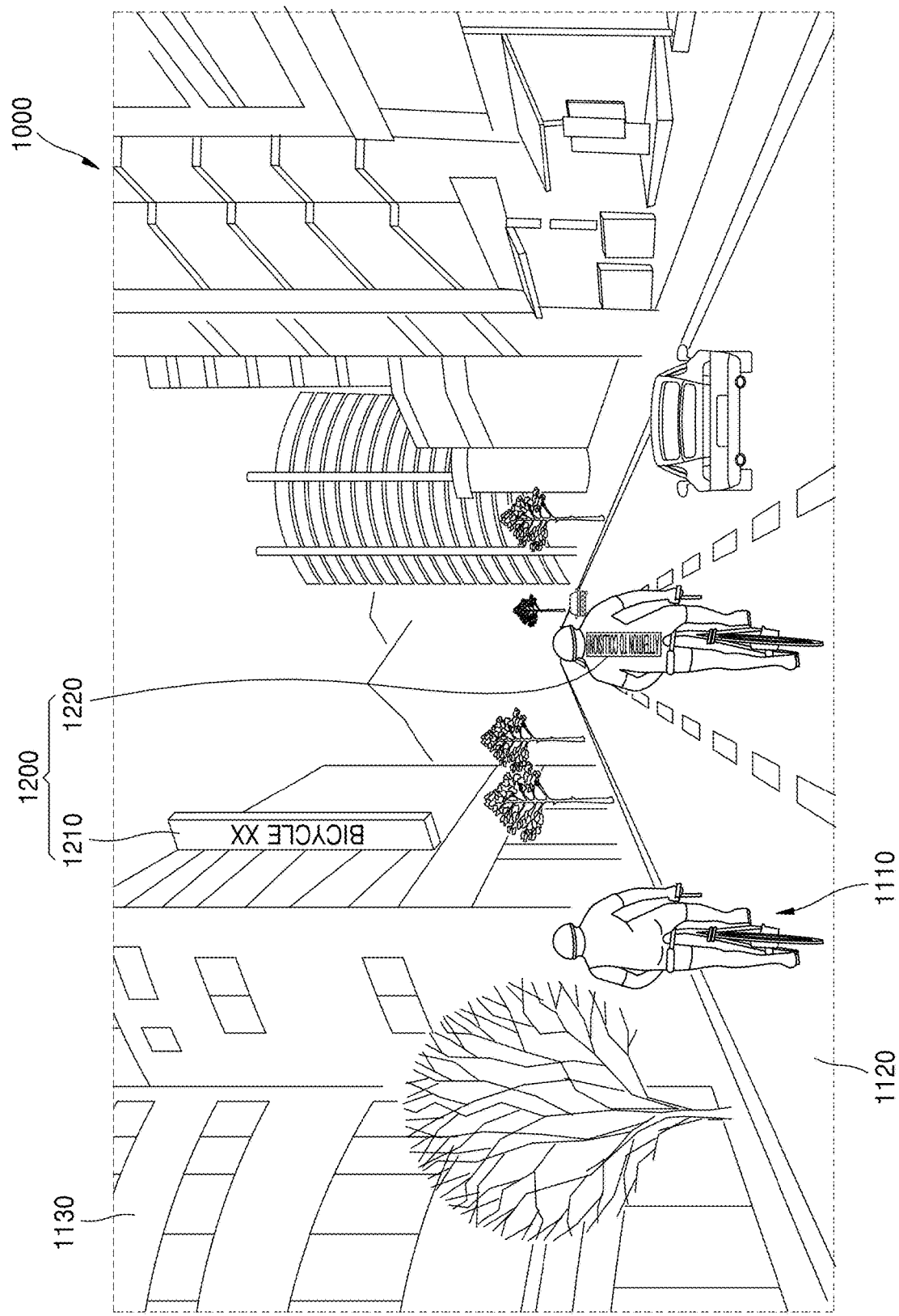
FIG. 4 shows a virtual image stored in a memory, according to an embodiment.

FIG. 4 shows a virtual image stored in a memory, according to an embodiment.

Referring to FIG. 4, a virtual image 1000 according to an embodiment may include one or more objects 1100 and a focused virtual image 1200. For example, the one or more objects 1100 may include arbitrary objects for indicating a bicycle riding environment. For example, the one or more objects 1100 may include one or more of a bicycle avatar 1110 indicating a rider riding on a bicycle, a riding road 1120, and an ambient object 1130.

In this specification, the bicycle avatar 1110 may be defined as a figure corresponding to the rider R using the bicycle simulator 1 and the bicycle 10 docked on the bicycle simulator 1 and displayed on the display 95. Also, the riding road 1120 may be defined as an arbitrary riding road on which the bicycle avatar 1110 may ride and as a figure displayed on the display 95. For example, the riding road 1120 may include one or more of a normal road, a velodrome, and a mountainous riding road. Also, the ambient object 1130 may refer to general objects except for the bicycle avatar 1110 and the riding road 1120 and may be defined as a figure displayed on the display 95. For example, the ambient object 1130 may include an ambient environmental object, such as a building, a tree, a mountain, a river, a bridge, etc.

For example, the bicycle avatar 1110 may be realized by using a human figure and a bicycle figure corresponding to physical information of the rider R and a model of the bicycle 10. For example, the memory 73 may store each type of human figures and bicycle figures corresponding to the physical information of the rider R and the model of the bicycle 10 input through the input portion 71 and the physical information of the rider R sensed by other sensing portions. As another example, the memory 73 may include an artificial intelligence (AI) program. By using the physical information of the rider R and the model of the bicycle 10 input through the input portion 71 and the physical information of the rider R sensed by other sensing portions, the AI program may form the bicycle avatar 1110 including a human figure and a bicycle figure not pre-stored.

For example, the bicycle avatar 1110 may include not only a bicycle avatar corresponding to the rider R using the bicycle simulator R but may also include a bicycle avatar corresponding to another rider (not shown) accessing the network 3 illustrated in FIG. 2A and a bicycle avatar virtually generated to boost the competitive spirit of the rider R.

For example, with respect to the riding road 1120 and the ambient object 1130, an image of each type of actual riding roads and ambient objects may be stored in the memory 73. Also, by using the image of each type of actual riding roads and ambient objects, the AI program may form the riding road 1120 and the ambient object 1130 including figures of a riding road and an ambient object not pre-stored.

In this specification, the focused virtual image 1200 may be defined as a figure selectively displayed on the display 95 correspondingly to the rider R using the bicycle simulator 1 and a riding state of the bicycle 10. For example, the focused virtual image 1200 may include a first focused image 1210 including sight information to be provided to the rider R and a second focused image 1220 for displaying the riding state of the bicycle. For example, the first focused image 1210 may include one or more of an advertisement image and identification information of a different rider. Also, the second focused image 1220 may include one or more of a speed, a distance, and a collision risk alert with respect to a bicycle of a competitive rider.

For example, with respect to the first focused image 1210 and the second focused image 1220, an image of each type of actual advertisements, pieces of speed and distance information, or alert messages may be stored in the memory 73. Also, by using the image of each type of actual advertisements, pieces of speed and distance information, or alert messages, the AI program may form the first focused image 1210 and the second focused image 1220 including a figure of an advertisement, a piece of speed and distance information, or an alert message not pre-stored.

Hereinafter, sensing of a change of the sight of the rider R and the virtual image 1000 changed according to the sensed change of the sight of the rider R are to be described in detail.

Figure 5:
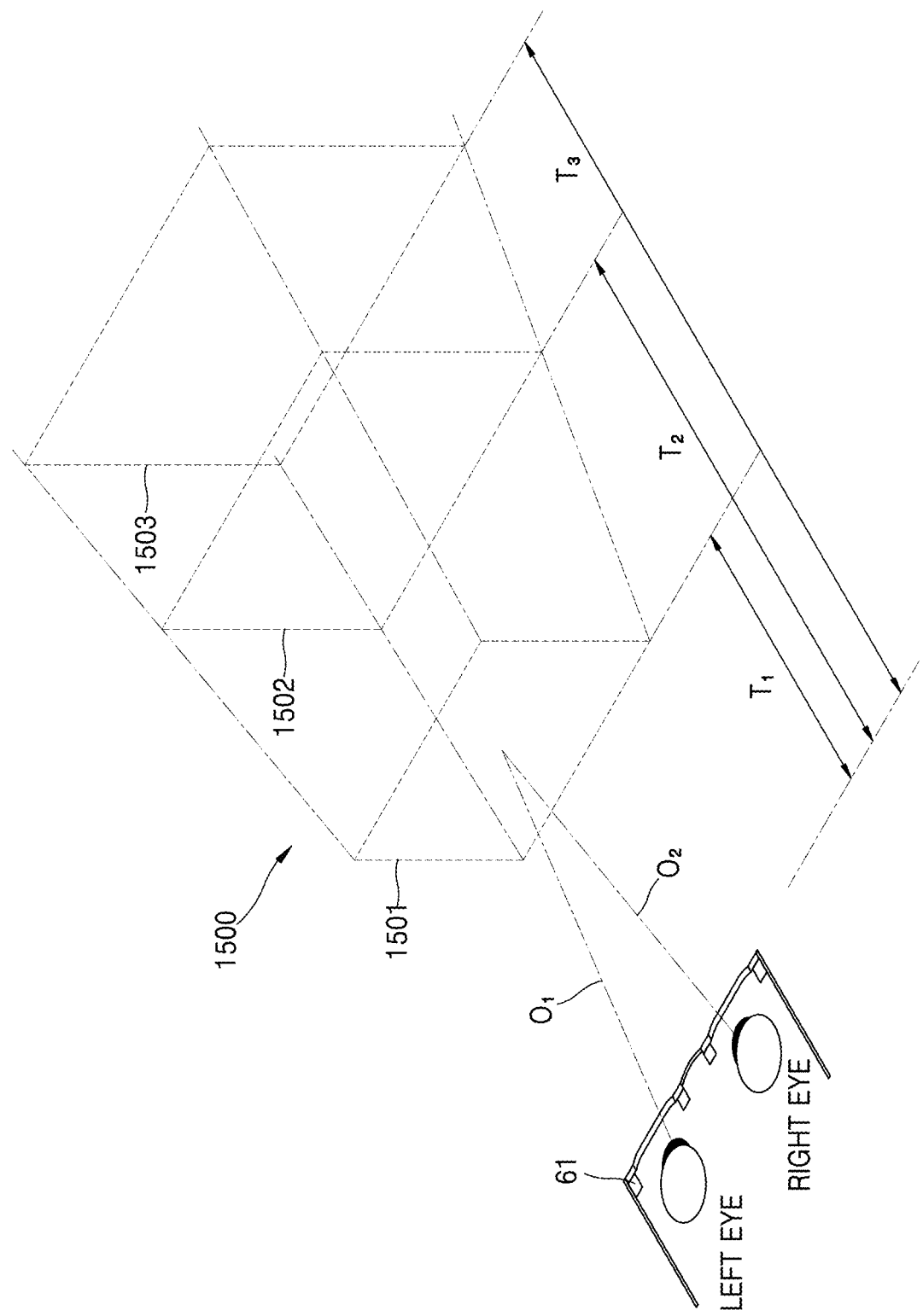
FIG. 5 is a schematic diagram showing a change of a position of the focus of both eyes of a rider, according to an embodiment.
Figure 6A:
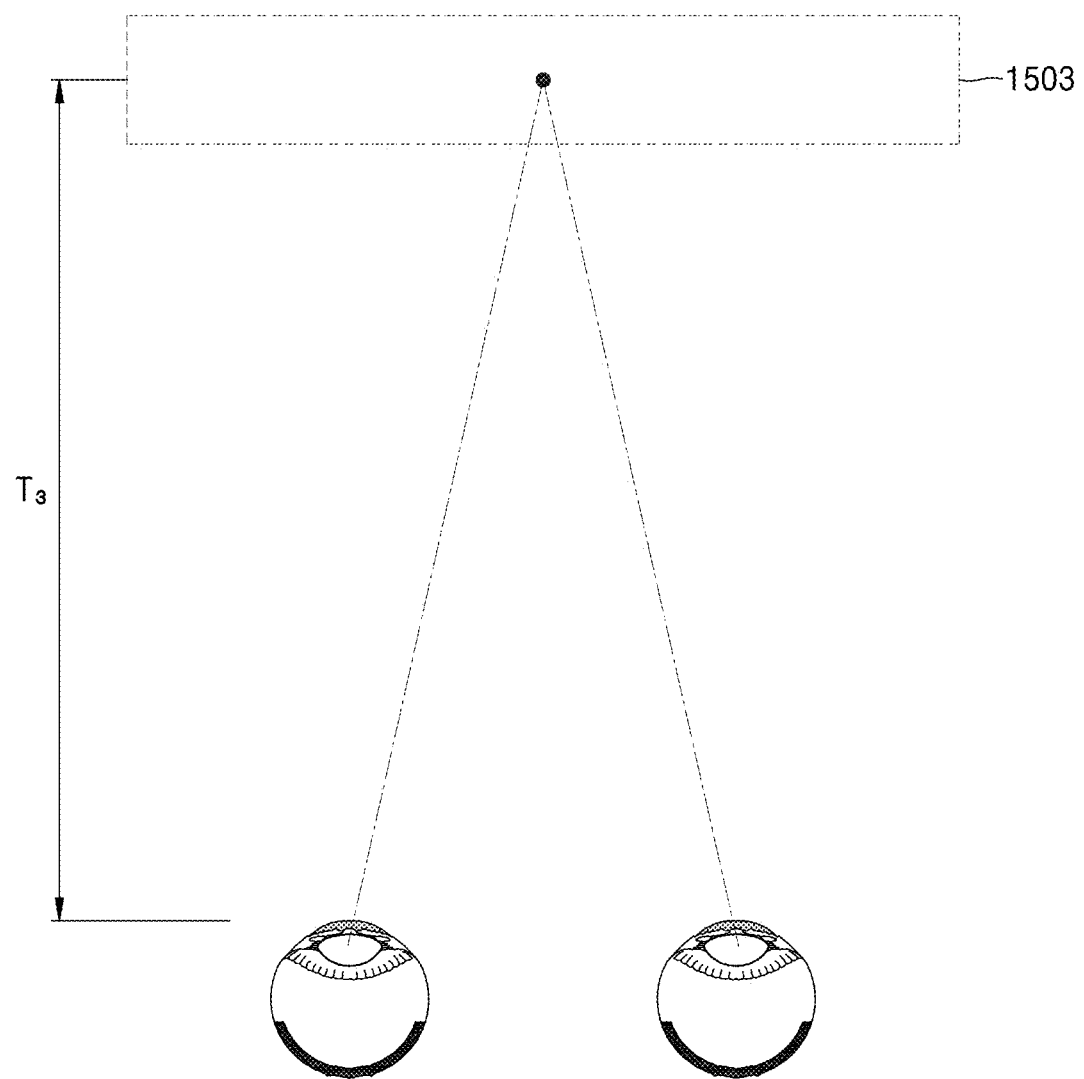
FIG. 6A is a schematic diagram showing an example in which the focus of both eyes of a rider is in a first position, according to an embodiment.
Figure 6B:
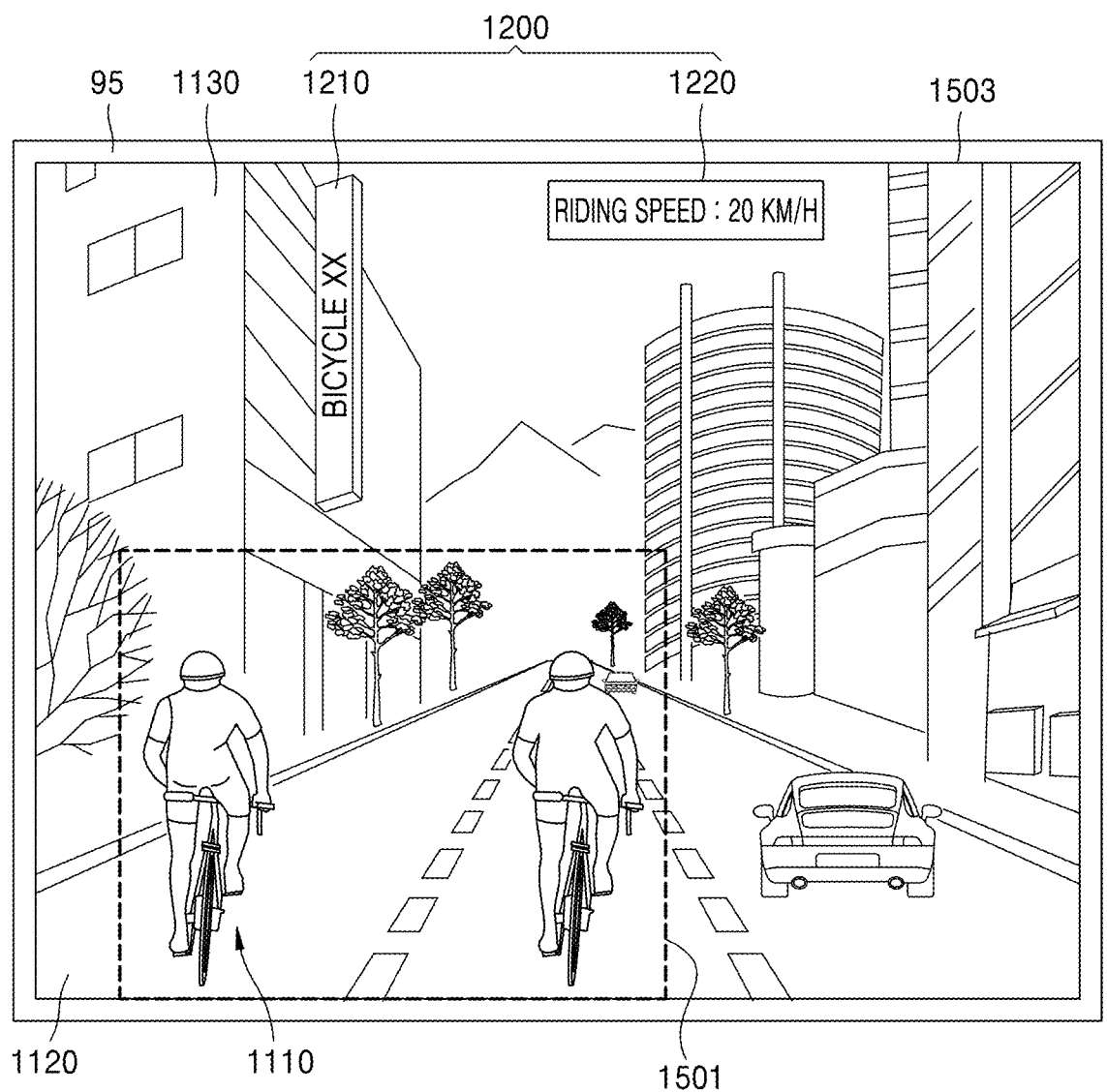
FIG. 6B shows a virtual image displayed on a display, when the focus of both eyes of a rider is in a first position, according to an embodiment.
Figure 7A:
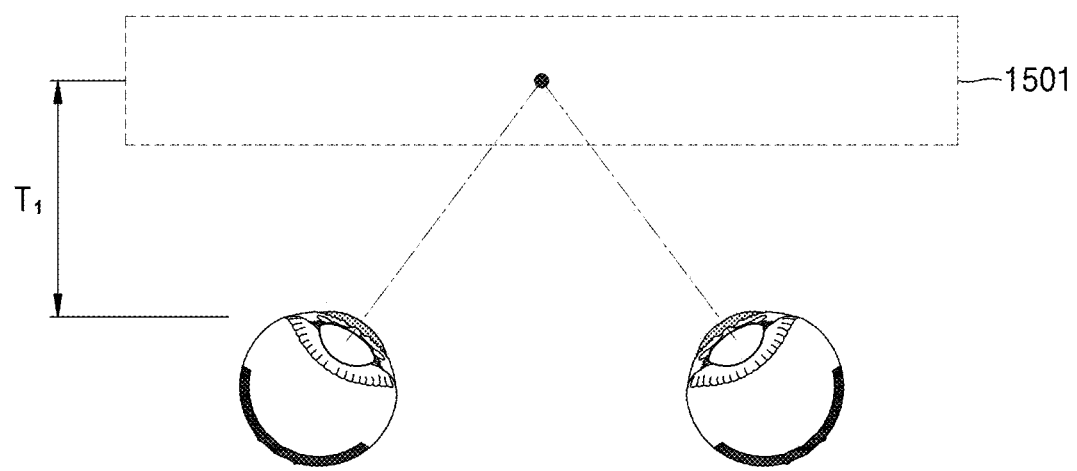
FIG. 7A is a schematic diagram showing an example in which the focus of both eyes of a rider is in a second position, according to an embodiment.
Figure 7B:
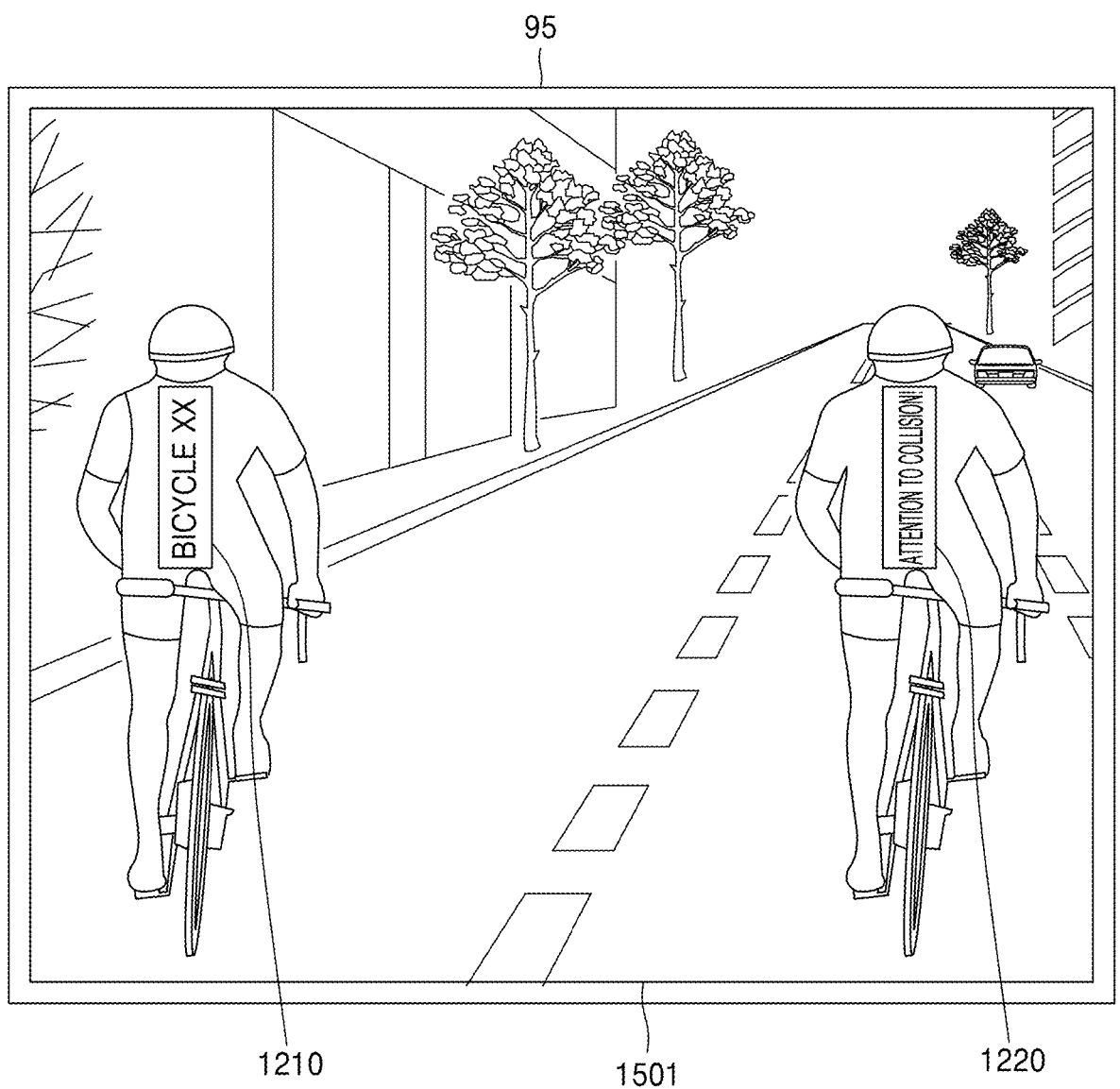
FIG. 7B shows a virtual image displayed on a display, when the focus of both eyes of a rider is in a second position, according to an embodiment.

FIG. 5 is a schematic diagram showing a change of a position of the focus of both eyes of a rider, according to an embodiment. FIG. 6A is a schematic diagram showing an example in which the focus of both eyes of a rider is in a first position, according to an embodiment. FIG. 6B shows a virtual image displayed on a display, when the focus of both eyes of a rider is in a first position, according to an embodiment. FIG. 7A is a schematic diagram showing an example in which the focus of both eyes of a rider is in a second position, according to an embodiment. FIG. 7B shows a virtual image displayed on a display, when the focus of both eyes of a rider is in a second position, according to an embodiment.

Referring to FIGS. 1A, 3, and 5, the first sensor portion 61 according to an example may obtain sight information of the rider R riding on the bicycle 10 docked on the bicycle simulator 1. For example, the first sensor portion 61 may include an arbitrary sensing device which may track the sight $O_1$ of the left eye of the rider R and the sight $O_2$ of the right eye of the rider R. For example, the first sensor portion 61 may use a reflection method by which light is irradiated to the pupil of the rider R and reflected light is sensed, an image sensing method by which an image of the pupil of the rider R is sensed, etc., but the disclosure is not limited thereto.

For example, the first sensor portion 61 may sense a focus position T to which the sight $O_1$ of the left eye of the rider R and the sight $O_2$ of the right eye of the rider R are focused. For example, as the focus position T of the rider R is changed, the processor 90 may reduce or expand a frame 1500 of a virtual image. In this specification, the frame 1500 of the virtual image may be defined as an area of the virtual image 1000, the area being displayed on the display 95 For example, when the focus position T of the rider R is sensed by the first sensor portion 61 as a first focus position $T_1$, a first frame 1501 of the virtual image having the smallest area of the virtual image 1000 may be displayed on the display 95. Also, when the focus position T of the rider R is sensed by the first sensor portion 61 as a second focus position $T_2$, a second frame 1502 of the virtual image of the virtual image 1000 may be displayed on the display 95. Also, when the focus position T of the rider R is sensed by the first sensor portion 61 as a third focus position $T_3$, a third frame 1503 of the virtual image having the largest area of the virtual image 1000 may be displayed on the display 95.

In more detail, referring to FIGS. 6A and 6B, when the focus position T of the rider R is sensed by the first sensor portion 61 as the third focus position $T_3$, the processor 90 may determine the frame 1503 of the virtual image of the virtual image 1000 illustrated in FIG. 4 to correspond to the third focus position $T_3$.

Also, referring to FIGS. 7A and 7B, when the focus position T of the rider R is sensed by the first sensor portion 61 as the first focus position $T_1$ which is shorter than the third focus position $T_3$, the processor 90 may determine the frame 1501 of the virtual image of the virtual image 1000, the frame 1501 being reduced to correspond to the first focus position $T_1$.

It may be identified that compared to the frame 1503 of the virtual image illustrated in FIG. 6B, the frame 1501 of the virtual image illustrated in FIG. 7B is reduced. In this case, the degree of concentration of the rider R may be improved, and thus, information delivery power with respect to the rider R may be improved. The processor 90 according to an example may arrange the focused virtual image 1200 on the reduced frame 1501 of the virtual image. For example, the focused virtual image 1200 may include one or more focused virtual images 1200 and may be pre-stored in the memory 73. For example, the focused virtual image 1200 may include the first focused image 1210 or the second focused image 1220, and the first focused image 1210 or the second focused image 1220 may be pre-stored in the memory 73.

For example, the processor 90 may generate the first focused image 1210 or the second focused image 1220 corresponding to a time point at which the frame 1501 of the virtual image is reduced. For example, as illustrated in FIG. 7B, when the frame 1501 of the virtual image is reduced, the processor 90 may generate the first focused image 1210 or the second focused image 1220 and may arrange the first focused image 1210 or the second focused image 1220 at a rear portion of the bicycle avatar 1110. For example, the first focused image 1210 may be an image of an advertisement selected according to personal information of the rider R obtained by using the input portion 71. Also, the second focused image 1220 may be an alert message notifying the risk of collision with a bicycle of a competitive rider. Accordingly, the advertisement effect and the alert effect with respect to the rider R may be improved. However, the disclosure is not limited thereto, and the focused virtual image 1200, for example, the first focused image 1210 or the second focused image 1220, may be arranged on an arbitrary area of the reduced frame 1501 of the virtual image.

It may be identified that compared to the frame 1501 of the virtual image illustrated in FIG. 7B, the frame 1503 of the virtual image illustrated in FIG. 6B is expanded. In this case, the field of vision of the rider R may be increased, and thus, information delivery power with respect to the rider R may be decreased. The processor 90 according to an example may arrange the focused virtual image 1200 on the expanded frame 1503 of the virtual image. For example, the processor 90 may arrange the first focused image 1210 or the second focused image 1220 on the ambient object 1130, for example, a building or the sky, as illustrated in FIG. 6B. Accordingly, the focused virtual image 1200 may be arranged on a relatively increased area.

However, because information delivery power with respect to the rider R may be decreased because the field of vision of the rider R is increased, an advertisement image having a low degree of alarm or a low cost may be arranged as the first focused image 1210 or the second focused image 1220. For example, the first focused image 1210 may be an advertisement image having a relatively low cost, determined according to personal information of the rider R obtained by using the input portion 71. Also, the second focused image 1220 may be an information message indicating a speed of a bicycle of a competitive rider. However, the disclosure is not limited thereto, and the focused virtual image 1200, for example, the first focused image 1210 or the second focused image 1220 may be arranged on an arbitrary area of the expanded frame 1503 of the virtual image.

Figure 8:
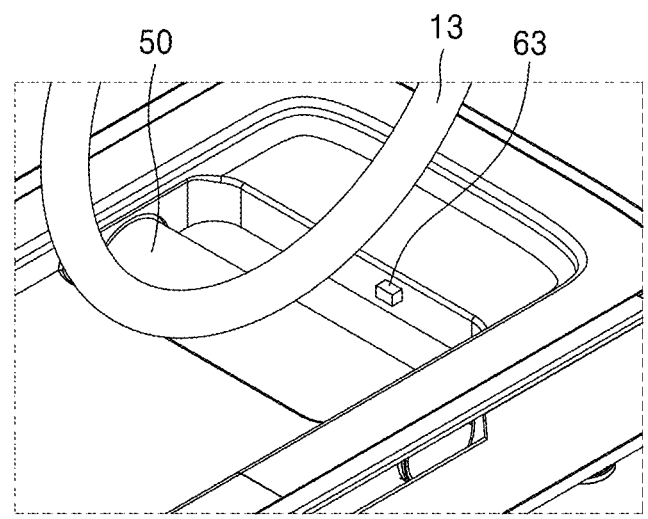
FIG. 8 is a partial perspective view of a bicycle simulator according to an embodiment.

FIG. 8 is a partial perspective view of a bicycle simulator according to an embodiment.

Referring to FIGS. 1A, 1B, and 8, the bicycle simulator 1 according to an embodiment may further include the third sensor portion 63 configured to sense a rotational speed and a rotational distance of one or more of the front wheel roller 40 and the rear wheel roller 50 of the bicycle simulator 1 according to an embodiment. The third sensor portion 63 according to an embodiment may be realized as a magnetic encoder including a magnetic flux sensor. For example, permanent magnets (not shown) with opposite polarities may be alternately arranged along an outer circumferential surface of the rear wheel roller 50. Here, the permanent magnets (not shown) may be integrally formed such that a half of the rear wheel roller 50 is formed of N-poles, and the other half is formed of S-poles, or the permanent magnets may be formed as a plurality of individual permanent magnets arranged along the circumferential surface to have a predetermined distance from each other. For example, the third sensor portion 63 may sense a magnetic flux interlinkage of the permanent magnet (not shown) that is regularly changed according to the rotation of the rear wheel roller 50 and may output the sensed magnetic flux interlinkage as an electrical signal. Thereafter, the output signal may be applied to the processor 90, and the rotational speed and the rotational distance of the rear wheel roller 50 may be sensed. According to an embodiment of the disclosure, the third sensor portion 63 is illustrated as the magnetic encoder including the magnetic flux sensor. However, the disclosure is not limited thereto. The third sensor portion 63 according to an example may be arranged not only in the rear wheel roller 50 but also in the front wheel roller 40 or in the front wheel roller 40 and the rear wheel roller 50.

As described above, the third sensor portion 63 may sense the rotational speed and the rotational distance of one or more of the front wheel roller 40 and the rear wheel roller 50 and transmit the sensed rotational speed and the rotational distance to the processor 90, and the processor 90 may calculate a riding speed and a riding distance of the bicycle 10 from circumferential sizes of the front wheel 12 and the rear wheel 13 and the number of rotations of the front wheel 12 and the rear wheel 13 per unit time.

For example, according to a change of the rotational speed of one or more of the front wheel roller 40 and the rear wheel roller 50, measured by the third sensor portion 63, the processor 90 may reduce or expand the frame 1500 of the virtual image. For example, it may be identified by the third sensor portion 63 that the rotational speed of one or more of the front wheel roller 40 and the rear wheel roller 50 is increased. Here, the processor 90 may control the first frame 1501 of the virtual image having the smallest area of the virtual image 1000 to be displayed on the display 95, as illustrated in FIG. 7B. For example, it may be identified by the third sensor portion 63 that the rotational speed of one or more of the front wheel roller 40 and the rear wheel roller 50 is decreased. Here, the processor 90 may control the third frame 1503 of the virtual image having the smallest area of the virtual image 1000 to be displayed on the display 95, as illustrated in FIG. 6B.

It may be identified that compared to the frame 1503 of the virtual image illustrated in FIG. 6B, the frame 1501 of the virtual image illustrated in FIG. 7B is reduced. That is, when the rotational speed of one or more of the front wheel roller 40 and the rear wheel roller 50 is increased, the field of vision of the rider R may be reduced, but the degree of concentration of the rider R may be increased. Thus, information delivery power with respect to the rider R may be improved. The processor 90 according to an example may arrange the focused virtual image 1200 on the reduced frame 1501 of the virtual image. Accordingly, the advertisement effect and the alert effect with respect to the rider R may be improved.

It may be identified that compared to the frame 1501 of the virtual image illustrated in FIG. 7B, the frame 1503 of the virtual image illustrated in FIG. 6B is expanded. That is, when the rotational speed of one or more of the front wheel roller 40 and the rear wheel roller 50 is decreased, the field of vision of the rider R may be increased, but information delivery power with respect to the rider R may be decreased. The processor 90 according to an example may arrange the focused virtual image 1200 on the expanded frame 1503 of the virtual image. Accordingly, the focused virtual image 1200 may be arranged on a relatively increased area. Aspects with respect to arranging of the reduced frame 1501 of the virtual image, the expanded frame 1503 of the virtual image, and the focused virtual image 1200 are substantially the same as described with reference to FIGS. 6B and 7B, and thus, their descriptions are omitted herein.

Figure 9A:
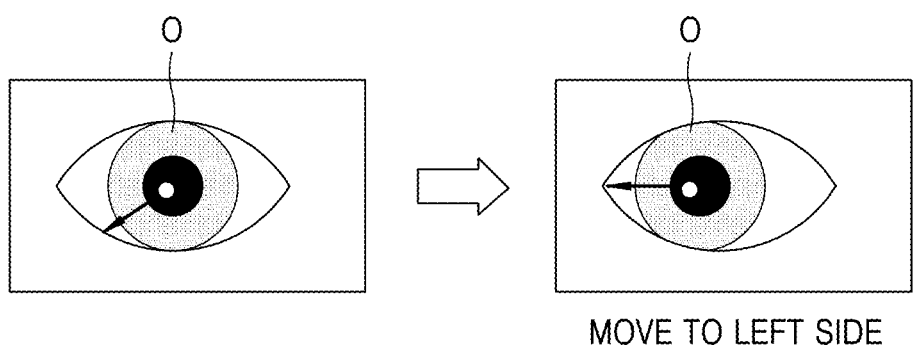
FIG. 9A is a schematic diagram showing a change of a sight direction of a rider, according to an embodiment.
Figure 9B:
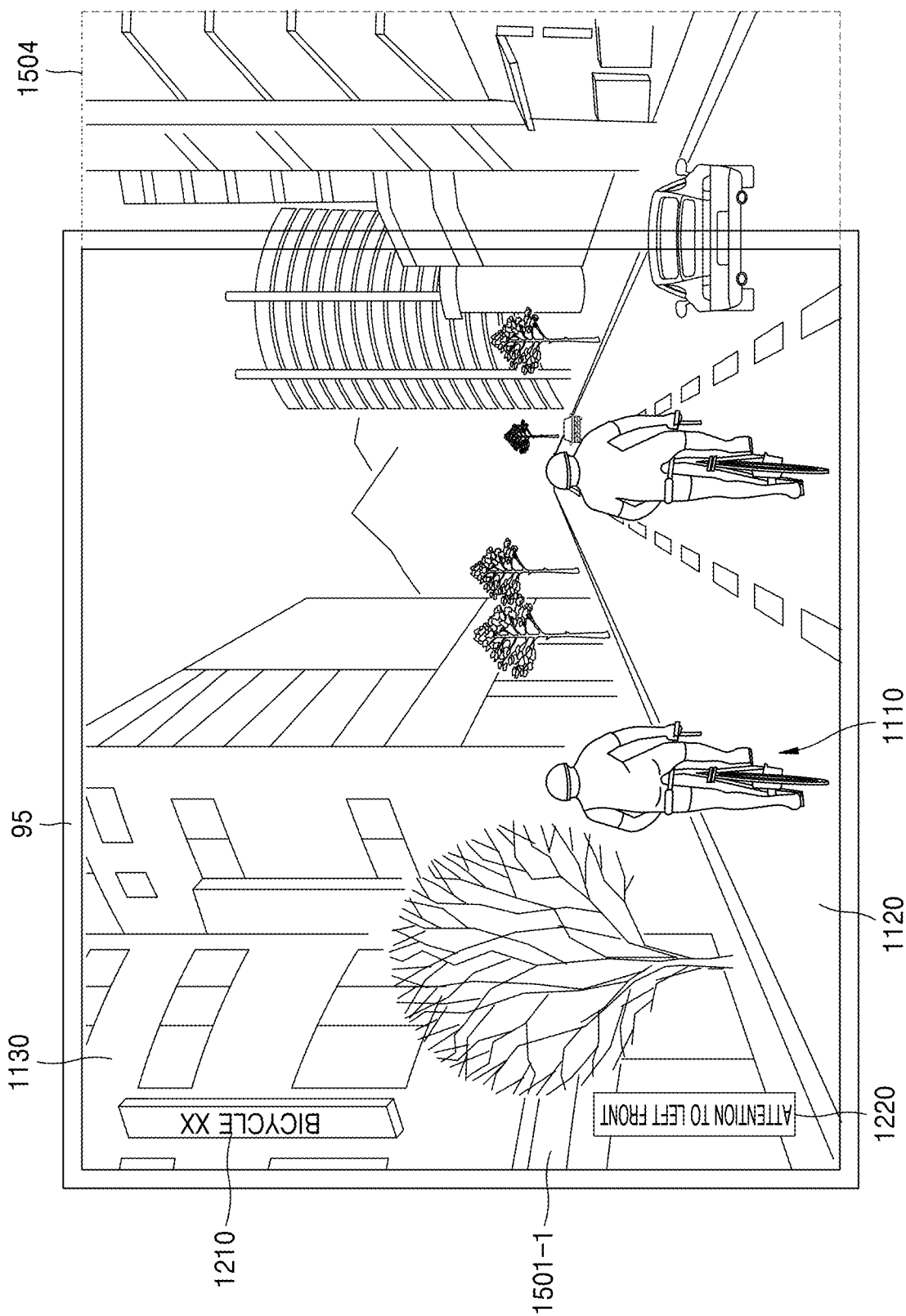
FIG. 9B shows a virtual image displayed on a display, when a sight direction of a rider is changed, according to an embodiment.
Figure 10A:
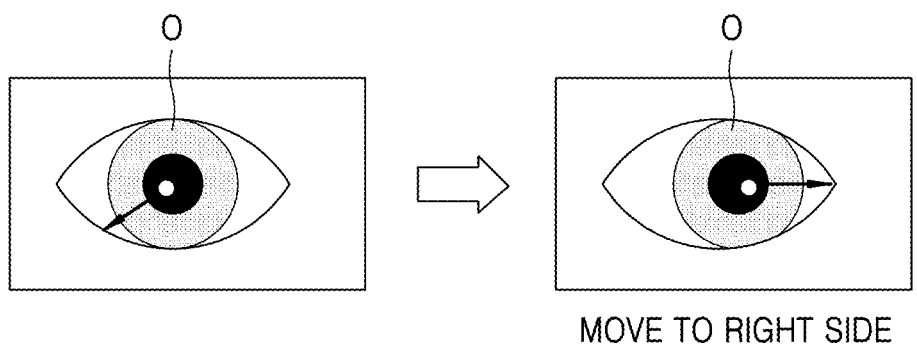
FIG. 10A is a schematic diagram showing a change of a sight direction of a rider, according to an embodiment.
Figure 10B:
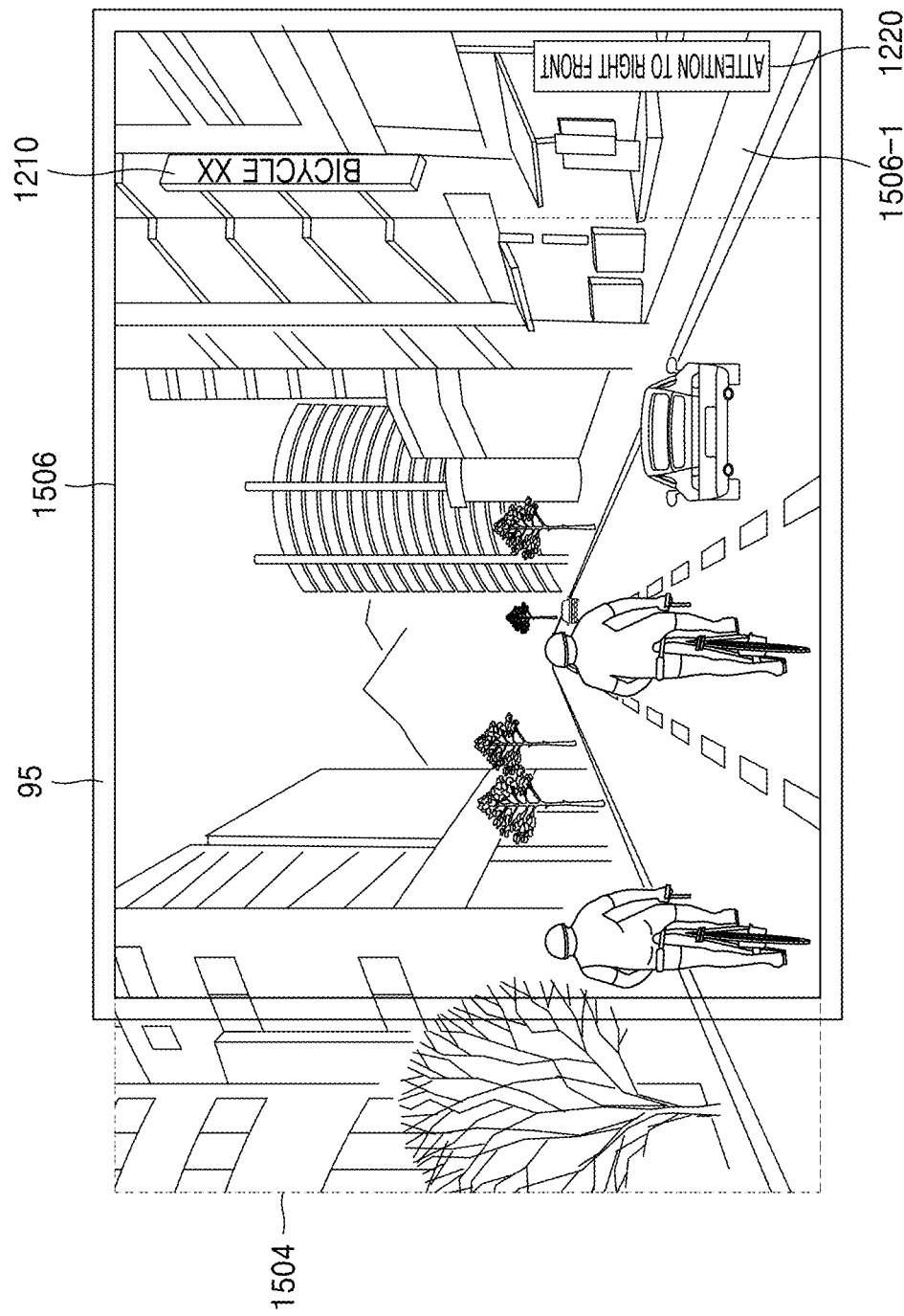
FIG. 10B shows a virtual image displayed on a display, when a sight direction of a rider is changed, according to an embodiment.

FIG. 9A is a schematic diagram showing a change of a sight direction of a rider, according to an embodiment. FIG. 9B shows a virtual image displayed on a display, when the sight direction of the rider is changed, according to an embodiment. FIG. 10A is a schematic diagram showing a change of a sight direction of a rider, according to an embodiment. FIG. 10B shows a virtual image displayed on a display, when the sight direction of the rider is changed, according to an embodiment.

Referring to FIGS. 1A, 3, and 9A to 10B, the first sensor portion 61 according to an example may obtain sight information of the rider R riding on the bicycle 10 docked on the bicycle simulator 1. For example, the first sensor portion 61 may include an arbitrary sensing device capable of tracking a sight direction of the eye O of the rider R. For example, the first sensor portion 61 may use a reflection method by which light is irradiated to the pupil of the rider R and reflected light is sensed, an image sensing method by which an image of the pupil of the rider R is sensed, etc., but the disclosure is not limited thereto.

For example, the first sensor portion 61 may sense a change of the sight direction of the eye O of the rider R. For example, when the sight direction of the eye O of the rider R is changed, the processor 90 may move the frame 1500 of the virtual image.

For example, when the first sensor portion 61 senses that the sight direction of the eye O of the rider R is moved to the left side or the right side, a fourth frame 1504 of the virtual image may also be moved to the left side or the right side. Accordingly, new frames 1505 and 1506 of the virtual image that are moved to the left side or the right side may be formed and displayed on the display 95. Here, new virtual image areas 1505-1 and 1506-1 may be generated on the moved frames 1505 and 1506 of the virtual image according to the frame movement.

In more detail, referring to FIGS. 9A and 9B, when it is sensed by the first sensor portion 61 that the sight direction of the eye O of the rider R is moved to the left side, the fourth frame 1504 of the virtual image may also be moved to the left side. Accordingly, a fifth frame 1505 of the virtual image may be formed and displayed on the display 95. Here, a first virtual image area 1505-1 may be generated on the fifth frame 1505 of the virtual image according to the frame movement.

Also, referring to FIGS. 10A and 10B, when it is sensed by the first sensor portion 61 that the sight direction of the eye O of the rider R is moved to the right side, the fourth frame 1504 of the virtual image may also be moved to the right side. Accordingly, a sixth frame 1506 of the virtual image may be formed and displayed on the display 95. Here, a second virtual image area 1506-1 may be generated on the sixth frame 1506 of the virtual image according to the frame movement.

Referring to FIGS. 9B and 10B, it may be identified that the fifth and sixth frames 1505 and 1506 of the virtual image are moved to the left side or the right side compared to the fourth frame 1504 of the virtual image. In this case, the degree of concentration of the rider R may be improved with respect to the newly generated virtual image areas 1501-1 and 1506-1, and thus, information delivery power with respect to the rider R may be improved. The processor 90 according to an example may arrange the focused virtual image 1200 on the newly generated virtual image areas 1505-1 and 1506-1. For example, the processor 90 may arrange the focused virtual image 1200 on the virtual image areas 1505-1 and 1506-1 correspondingly to a time point at which the frames 1505 and 1506 of the virtual image are moved. Here, the focused virtual image 1200 may include the first focused image 1210 or the second focused 1220 as described above.

In more detail, as illustrated in FIG. 9B, when the fourth frame 1504 of the virtual image is moved to the left side, and thus, the fifth frame 1505 of the virtual image is generated, the processor 90 may arrange the first focused image 1210 or the second focused image 1220 on the first virtual image area 1505-1. In more detail, as illustrated in FIG. 10B, when the fourth frame 1504 of the virtual image is moved to the right side, and thus, the sixth frame 1506 of the virtual image is generated, the processor 90 may arrange the first focused image 1210 or the second focused image 1220 on the second virtual image area 1506-1. For example, the first focused image 1210 may be an image of an advertisement or an alert message selected according to personal information of the rider R obtained by using the input portion 71. Aspects with respect to the first focused image 1210 and the second focused image 1220 are substantially the same as described with reference to FIGS. 6B and 7B, and thus, their descriptions are omitted herein.

Figure 11A:
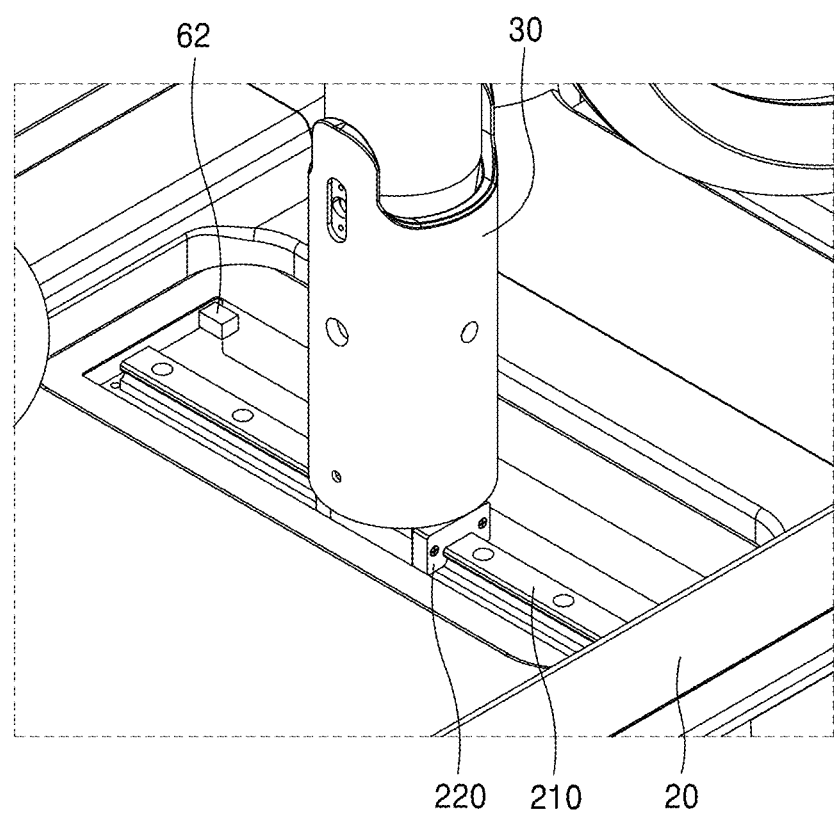
FIG. 11A is a partial perspective view of a bicycle simulator according to an embodiment.
Figure 11B:
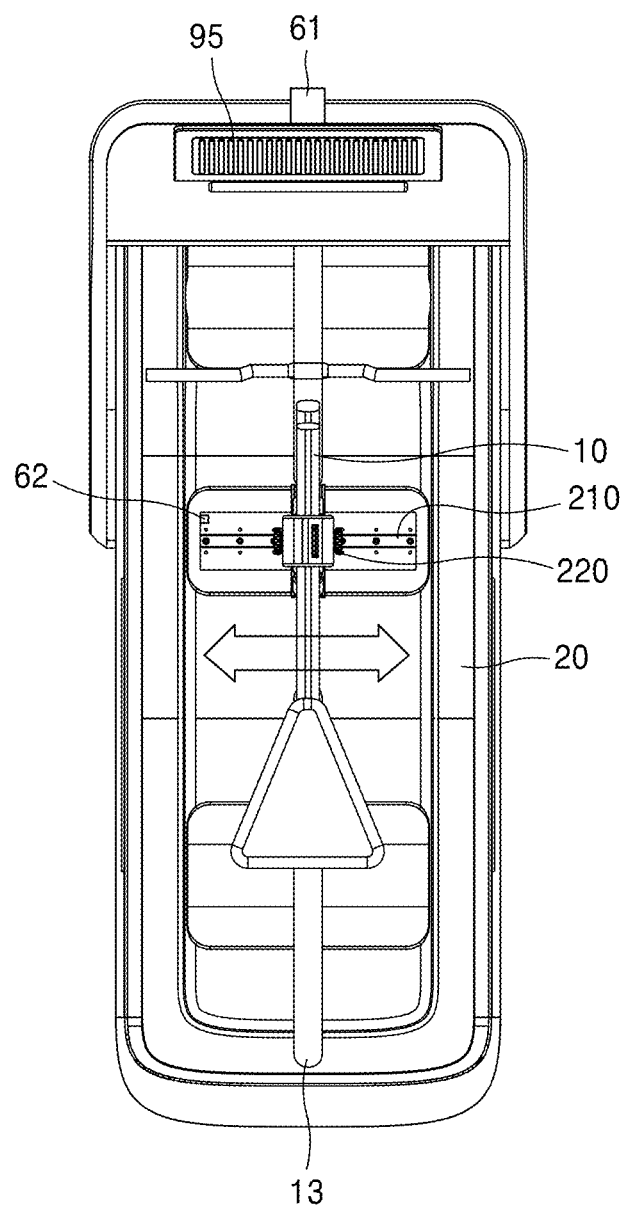
FIG. 11B is a plan view of a bicycle simulator according to an embodiment.

FIG. 11A is a partial perspective view of a bicycle simulator according to an embodiment. FIG. 11B is a plan view of the bicycle simulator according to an embodiment.

Referring to FIGS. 11A and 11B, the bicycle simulator 1 according to an embodiment may further include a slide guide 210 arranged between both side portions of the base portion 20, a slide portion 220 fixed to an end of the frame support portion 30 and connected to the slide guide 210 to be movable along the slide guide 210, and the second sensor portion 62 configured to sense a movement direction and a movement distance of the slide portion 220.

The slide guide 210 may be formed as a slide rail extending in a direction. For example, the slide guide 210 may be arranged to be fixed between both side portions of the base portion 20. The slide portion 220 may be fixed to an end of the frame support portion 30 and may move in a direction together with the frame support portion 30. Accordingly, the second sensor portion 62 may sense the movement of the slide portion 220 in a direction to sense the movement of the frame support portion 30 in a direction. Here, the slide portion 220 may be arranged to be inserted into the slide guide 210, and thus, the slide portion 220 may move along the slide guide 210.

The second sensor portion 62 may be a distance sensor configured to sense or track a movement gap generated as the slide portion 220 moves along the slide guide 210. For example, the second sensor portion 62 may be a time-of-flight (ToF) sensor, which is a type of distance sensor. For example, when the second sensor portion 62 is realized as a ToF sensor, the second sensor portion 62 may be configured to detect reflection light, which is the light irradiated from a light source (not shown) for irradiating predetermined light and then reflected from a portion of the slide portion 220. According to the embodiment described above, the second sensor portion 62 is described as a ToF sensor, for example. However, the disclosure is not limited thereto. The second sensor portion 62 according to an example may be realized as an arbitrary sensing device capable of sensing and tracking a movement gap of the slide portion 220 with respect to the base portion 20.

According to an example, the second sensor portion 62 may be arranged to be fixed to one or more of both side portions of the base portion 20. Accordingly, the second sensor portion 62 may sense a movement distance and a right or left movement direction of the slide portion 220 with respect to the base portion 20. According to the movement direction of the slide portion 220 that is sensed by the second sensor portion 62, a riding direction of the bicycle 10 may be sensed, and according to the movement distance of the slide portion 220 that is sensed by the second sensor portion 62, a riding position of the bicycle 10 may be sensed.

According to an example, according to a change of the movement direction and the movement distance of the slide portion 220 that is measured by the second sensor portion 62, the processor 90 may move the frame 1500 of the virtual image. For example, as illustrated in FIG. 11B, the second sensor portion 62 may sense that the slide portion 220 is moved to the left side or the right side. Here, the processor 90 may move the fourth frame 1504 of the virtual image to the left side or the right side as illustrated in FIGS. 9B and 10B. Accordingly, the new frames 1505 and 1506 of the virtual image moved to the left side or the right side may be formed and displayed on the display 95. In this case, the new virtual image areas 1505-1 and 1506-1 may be generated on the moved frames 1505 and 1506 of the virtual image according to the frame movement. The processor 90 according to an example may arrange the focused virtual image 1200 on the newly generated virtual image areas 1505-1 and 1506-1. According to an example, aspects with respect to the processor 90 moving the frames 1505 and 1506 of the virtual image and arranging the focused virtual image 1200 on the virtual image areas 1505-1 and 1506-1 are substantially the same as illustrated with reference to FIGS. 9B and 10B, and thus, their descriptions are omitted herein.

Figure 12:
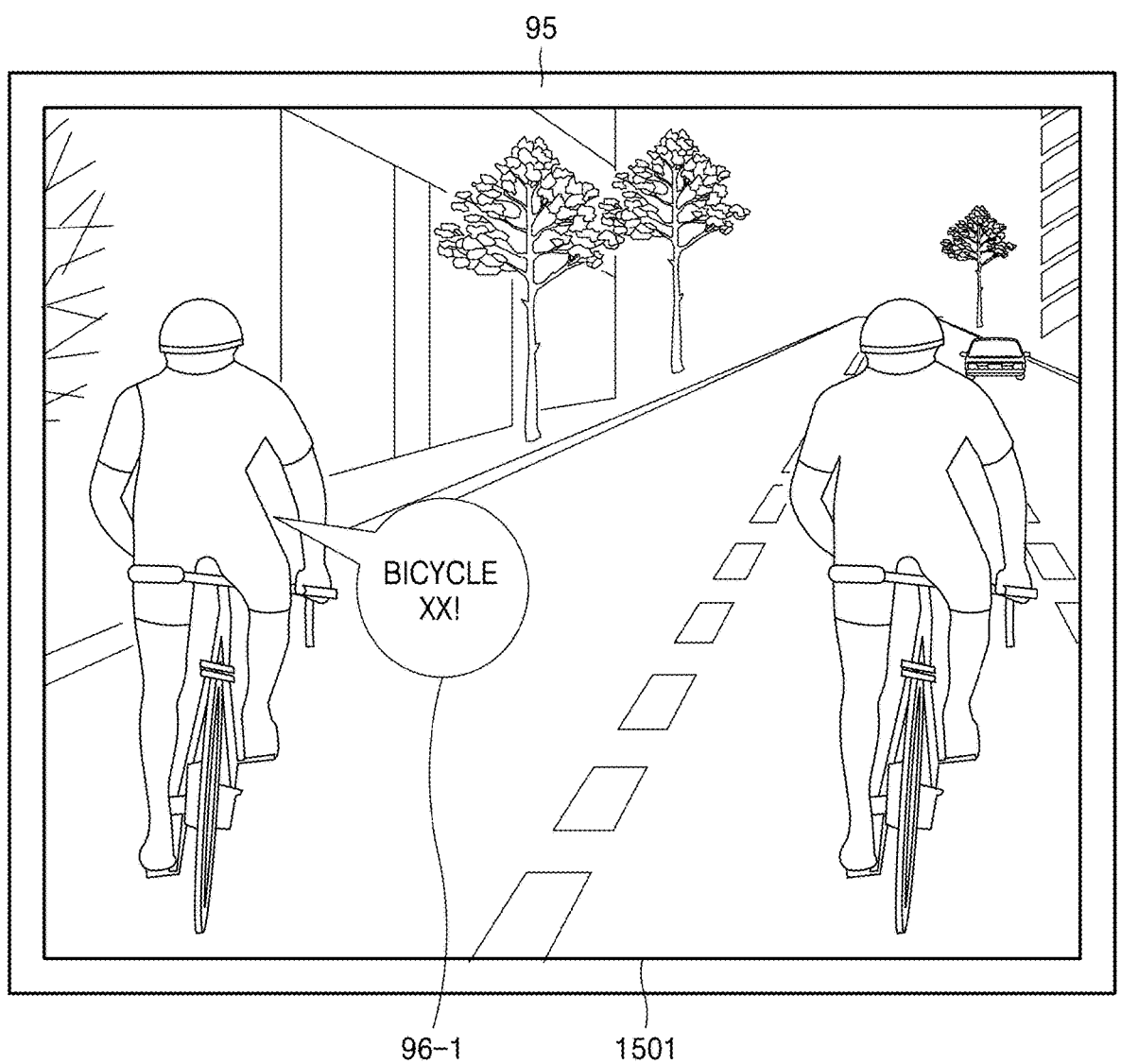
FIG. 12 shows a virtual image in which auditory information is displayed on a display, according to an embodiment.

FIG. 12 shows a virtual image in which auditory information is displayed on a display, according to an embodiment.

Referring to FIGS. 2A and 12, the auditory output portion 96 according to an example may auditorily transmit, to the rider R, an advertisement, an alert message according to a riding danger, a riding environment with respect to a course of a bicycle competition or the like, an operating system program, etc. For example, the auditory output portion 96 may include an arbitrary audio device, etc. capable of transmitting auditory information to the rider R.

Referring to FIGS. 1A, 3, and 5, the first sensor portion 61 according to an example may sense a focus position T1 of the sight $O_1$ of the left eye of the rider R riding on the bicycle 10 docked on the bicycle simulator 1 and the sight $O_2$ of the right eye of the rider R. For example, as the focus position T of the rider R is changed, the processor 90 may reduce or expand a frame 1500 of a virtual image. For example, when the focus position T of the rider R is sensed by the first sensor portion 61 as a first focus position $T_1$, a first frame 1501 of the virtual image having the smallest area of the virtual image 1000 may be displayed on the display 95 as illustrated in FIG. 7B. In this case, the degree of concentration of the rider R may be improved, and thus, information delivery power with respect to the rider R may be improved.

When the frame 1501 of the virtual image is reduced, the processor 90 according to an example may generate auditory information having a high degree of concentration. For example, the auditory information generated by the processor 90 may be pre-stored in the memory 73. For example, as illustrated in FIG. 12, the processor 90 may output, correspondingly to a time point at which the frame 1501 of the virtual image is reduced, auditory information 96-1 having a high degree of concentration, for example, information about an advertisement selected according to personal information of the rider R obtained by using the input portion 71 or an alert message indicating the risk of collision with a bicycle of a competitive rider.

Also, when the frame 1503 of the virtual image is expanded as illustrated in FIG. 6B, the processor 90 according to an example may generate auditory information having a low degree of concentration. For example, the processor 90 may output, correspondingly to a time point at which the frame 1503 of the virtual image is expanded, auditory information (not shown) having a low degree of concentration, for example, information about a lost cost advertisement selected according to personal information of the rider R obtained by using the input portion 71 or a message indicating riding information. However, the disclosure is not limited thereto, and regardless of the reduction or expansion of the frame 1503 of the virtual image, the auditory information may be output at an arbitrary time point.

Herein, predetermined embodiments of the disclosure are described and illustrated. However, the disclosure is not limited to the described embodiments, and various modifications and alterations may be made without departing from the concept and the scope of the disclosure, which may be obvious to one of ordinary skill in the art. Therefore, the modifications and alterations should not be understood to be separate from the technical concept or perspective of the disclosure. Rather, the modified embodiments should be understood to be included in the scope of the claims of the disclosure.

The invention claimed is:

1. A bicycle simulator comprising:
    a base portion;
    a frame support portion connected to the base portion to be movable in a direction and configured to support a bicycle frame of a bicycle docked, the bicycle frame connecting a front wheel with a rear wheel of the bicycle;
    a first sensor portion configured to obtain sight information of a rider riding on the bicycle;
    a processor configured to generate a virtual image that is changed according to the sight information of the rider obtained by the first sensor portion; and
    a display displaying the virtual image;
    a front wheel roller configured to support the front wheel of the bicycle and rotate together with rotation of the front wheel;
    a rear wheel roller configured to support the rear wheel of the bicycle and rotate together with rotation of the rear wheel; and
    a third sensor portion configured to sense a rotational speed or a rotational distance of the front wheel roller, the rear wheel roller, or both;
    wherein the processor is further configured to reduce or expand a frame of the virtual image according to a change of the rotational speed of one or more of the front wheel roller and the rear wheel roller; and
    wherein the processor is further configured to, when the rotational speed of the one or more of the front wheel roller and the rear wheel roller is increased, arrange a focused virtual image on the reduced frame of the virtual image.

2. The bicycle simulator of claim 1, wherein the sight information sensed by the first sensor portion comprises a change of a sight direction of the rider and wherein the processor is further configured to move a frame of the virtual image according to the change of the sight direction of the rider.

3. The bicycle simulator of claim 2, wherein the processor is further configured to arrange a focused virtual image on a virtual image area generated as the frame of the virtual image is moved.

4. The bicycle simulator of claim 1, further comprising:
    an input portion configured to input personal information of the rider; and
    a memory storing one or more focused virtual images,
    wherein the processor is further configured to select a focused virtual image from among the one or more focused virtual images according to the personal information of the rider and arrange the selected focused virtual image on a virtual image area.

5. The bicycle simulator of claim 1, further comprising:
    a slide guide fixed to the base portion and extending in a direction;
    a slide portion fixed to an end of the frame support portion and connected to the slide guide to be movable in the direction on the slide guide; and
    a second sensor portion configured to sense a movement direction and a movement distance of the slide portion configured to move on the slide guide.

6. The bicycle simulator of claim 5, wherein the processor is further configured to move a frame of the virtual image according to a change of the movement direction and the movement distance of the slide portion obtained by the second sensor portion.

7. The bicycle simulator of claim 5, wherein the processor is further configured to arrange a focused virtual image on a virtual image area generated as a frame of the virtual image is moved.

8. The bicycle simulator of claim 1, wherein the sight information sensed by the first sensor portion comprises a change of a focus position of both eyes of the rider.

9. The bicycle simulator of claim 8, wherein the processor is further configured to reduce or expand a frame of the virtual image according to the change of the focus position of both eyes of the rider.

10. The bicycle simulator of claim 1, wherein the processor is further configured to generate auditory information that is changed according to the sight information of the rider obtained by the first sensor portion, the bicycle simulator further comprising an auditory output portion configured to output the auditory information.

11. The bicycle simulator of claim 1, wherein the display comprises a wearable augmented reality device to be worn by the rider, and the first sensor portion is arranged in the wearable augmented reality device.

* * * * *